(12) United States Patent
Andreev et al.

(10) Patent No.: US 7,844,735 B2
(45) Date of Patent: Nov. 30, 2010

(54) DETERMINING ADDRESS OF EDGE SERVER BY USING AUTHORITATIVE DOMAIN NAME SERVER AND BYPASSING ASSIGNED DOMAIN NAME SERVER

(75) Inventors: Dmitry Andreev, Port Chester, NY (US); Galina Grunin, Briarcliff Manor, NY (US); Luu Quoc Nguyen, Culver City, CA (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1301 days.

(21) Appl. No.: 11/120,344

(22) Filed: May 3, 2005

(65) Prior Publication Data

US 2006/0253609 A1 Nov. 9, 2006

(51) Int. Cl.
G06F 15/16 (2006.01)
G06F 15/173 (2006.01)

(52) U.S. Cl. .................. 709/245; 709/203; 709/217; 709/219; 709/227; 709/238; 709/239

(58) Field of Classification Search ................ 709/238, 709/239, 245, 203, 217, 219, 227
See application file for complete search history.

(56) References Cited

U.S. PATENT DOCUMENTS 6,829,654 B1 12/2004 Jungck
2002/0010798 A1* 1/2002 Ben-Shaul et al. .......... 709/247
2003/0055979 A1* 3/2003 Cooley ....................... 709/227
2003/0115346 A1* 6/2003 McHenry et al. ............ 709/229
2005/0021863 A1* 1/2005 Jungck ........................ 709/246
2006/0112176 A1* 5/2006 Liu et al. ..................... 709/223

* cited by examiner

Primary Examiner—Kevin Bates
Assistant Examiner—Mohammed Ahmed
(74) Attorney, Agent, or Firm—Dillon & Yudell LLP (57) ABSTRACT

A method and system is presented for bypassing a local Domain Name Server (DNS) when using edge caching servers. Domain names of frequently used business applications that are known to rely upon edge servers, together with the corresponding authoritative DNSs, are listed in both local hosts file and user defined FSFD local configuration file fsfd.conf. When the client computer's browser attempts to resolve a domain name, a File System Filtering Driver (FSFD) in the client computer intercepts the browser's request. If the domain name which is being resolved is found in a local FSFD configuration file fsfd.conf, then the FSFD initiates a DNS request directly to the appropriate authoritative DNS whose IP address gets extracted from the fsfd.conf record, thus bypassing the local DNS. The authoritative DNS returns the IP address for an edge caching server that is topographically proximate to the client computer's browser.

14 Claims, 6 Drawing Sheets

DETERMINING ADDRESS OF EDGE SERVER BY USING AUTHORITATIVE DOMAIN NAME SERVER AND BYPASSING ASSIGNED DOMAIN NAME SERVER

BACKGROUND OF THE INVENTION

1. Technical Field

The present invention relates in general to the field of computers, and in particular to computers on a wide area network such as the Internet. Still more particularly, the present invention relates to a method and system that allows a client computer to retrieve a subset of content served by a web server from a topologically closest edge caching server.

2. Description of the Related Art

As the World Wide Web (WWW or "web") becomes more populated with webpages from web servers, network traffic control becomes more critical. Efficient delivery of such webpages is improved by caching webpages in edge servers.

All WWW-based systems are capable of using a Domain Name Server (DNS). When searching for a website, a user will typically type into her browser a Uniform Resource Locator (URL), which is a global address for a resource on the web. For example, the URL of www.ibm.com is a global address that includes a protocol (www) for a website, the website's domain name (".ibm"), as well as the domain name's extension (".com") that describes the website as being commercial. However, the URL alone will not locate the website, which is actually located at an Internet Protocol (IP) address that consists of four numbers separated by periods (such as 255.255.210.11). Thus, to locate the website, the URL must be translated into an IP address. This is performed by a Domain Name Server (DNS).

Figure 1A:
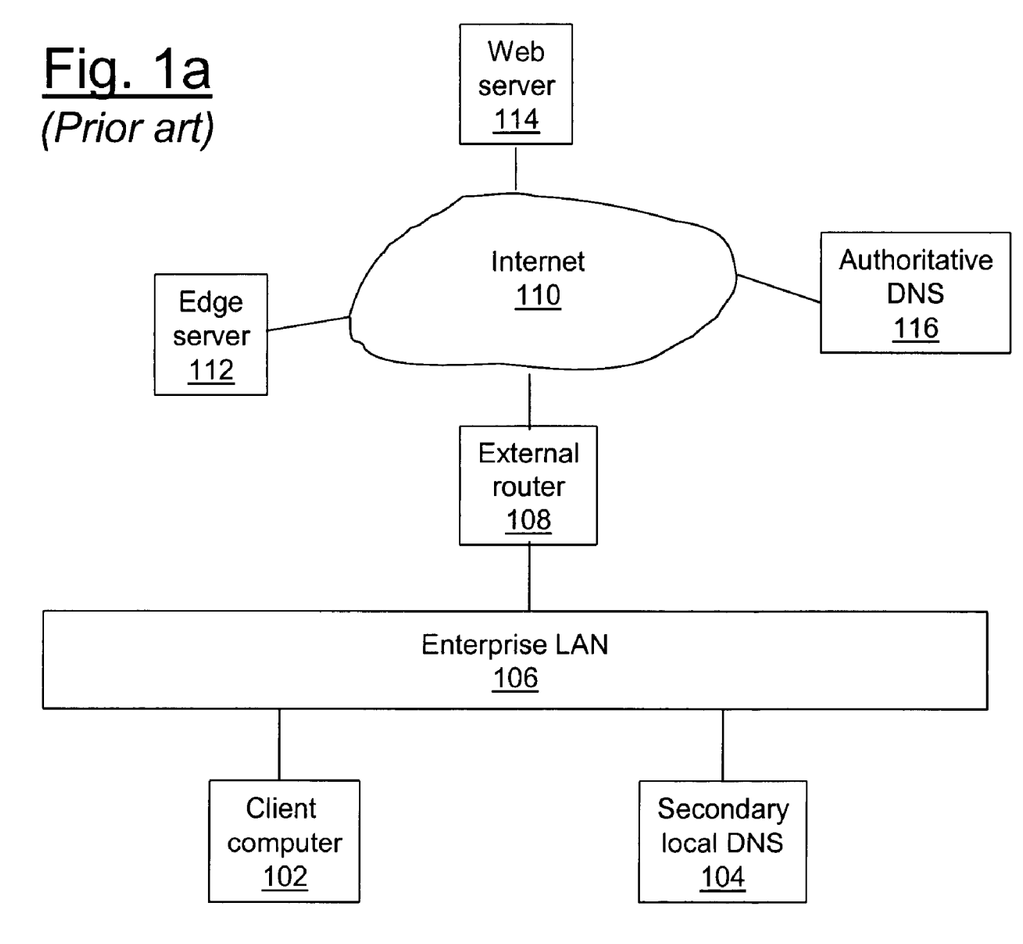
FIGS. 1a-b depict prior art edge cache grid networks.

An exemplary system using edge servers is shown in FIG. 1a. A client computer 102 and a secondary local DNS 104 are coupled to an enterprise Local Area Network (LAN) 106. The secondary DNS 104 is a DNS caching server that contains IP addresses for web servers and caching servers from an authoritative DNS 116 that is on the external side of the enterprise LAN 106. As is known to those skilled in the art of network architecture and address resolution, an authoritative DNS server holds definitive DNS records for a given domain name. Such a server may or may not contain DNS records for domain names other than those for which it is the authority. When queried by a resolver, a DNS server either returns a result from its cache, or follows a DNS authority chain to ultimately consult the authoritative DNS server for a zone in question.

The enterprise LAN 106 is coupled, via an external router 108, to the Internet 110. Coupled to the Internet 110 are an edge server 112, a web server 114, as well as the authoritative DNS 116 already mentioned.

The web server 114 is an original web server, and contains the original copy of webpages and other content ascribed to the URL associated with web server 114. Edge server 112 contains some or all of the webpages stored on web server 114. Therefore, edge server 112 is often referred to as an edge caching server, since it holds a copy (all or part) of a webpage, in a manner analogous to memory caches, and ideally is topologically closer to a webpage requesting client computer 102 than the original web server 114.

Before requesting content from web server 114, client computer 102 first queries the local DNS 104 which, in turn, queries the authoritative DNS 116; the latter is programmed to return the IP address of the edge server closest to the requestor in terms of the metrics chosen (e.g. number of network hops) and hence would return the IP address of edge server 112. In the topology shown in FIG. 1a, local DNS 104 forwards that IP address to the client computer 102.

Operation of the system shown in FIG. 1a is based upon an implicit assumption that a local DNS is located close to client computers which query it for domain name resolution. Hence an edge server closest to a local DNS would be also closest to the client machines that the local DNS serves.

Figure 1B:
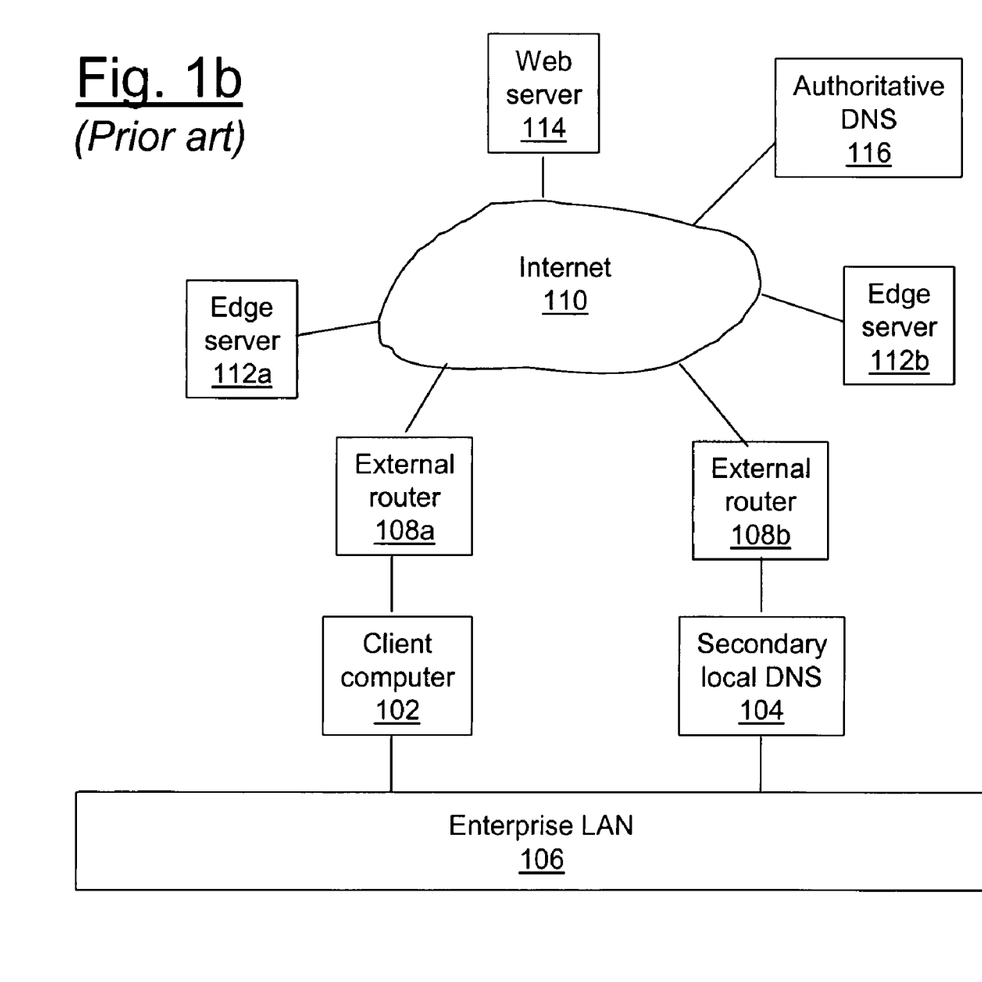

While the system shown in FIG. 1a generally works well, a major problem can arise when the above implicit assumption is not satisfied. For example, when client computer 102 is connected to a geographically distributed corporate network 106 (see FIG. 1b), where client computer 102 and DNS 104 use different routers (108a and 108b respectively) to connect to the Internet 110, the distance between the two routers is a considerable value in terms of the metrics chosen for the edge caching implementation. For example, assume for illustrative purposes that external router 108a is in California and external router 108b is 3,000 miles away in New York. Also assume that edge server 112a is near California while edge server 112b is near New York. According to the topology described in FIG. 1a, client computer 102 will ask secondary local DNS 104 for the IP address of an edge server 112 that has desired content. Secondary local DNS 104 will, when queried, return the IP address of the edge server 112 that is closest to secondary local DNS 104, even though it is much farther away from client computer 102 that edge server 112a, which also has a copy of the desired content. Thus the desired benefit of using nearby caching edge servers is defeated, since the edge server 112 chosen by secondary local DNS 104 is actually farther away from client computer 102 than the authoritative web server 114.

SUMMARY OF THE INVENTION

In response to the shortcomings of the prior art system described, the present invention is thus directed to a method and system for bypassing a local Domain Name Server (DNS) when using edge caching servers. The client computer is configured to resolve domain names against local hosts file before querying DNS. Domain names of frequently used business applications that are known to rely upon edge servers, together with the corresponding authoritative DNSs, are listed in both local hosts file and user defined FSFD local configuration file fsfd.conf. When the client computer's browser attempts to resolve a domain name, a File System Filtering Driver (FSFD) in the client computer intercepts the browser's request. If the domain name which is being resolved is found in a local FSFD configuration file fsfd.conf, then FSFD initiates a DNS request directly to the appropriate authoritative DNS whose IP address gets extracted from the fsfd.conf record, thus bypassing the local DNS. The authoritative DNS returns the IP address for an edge caching server that is topographically proximate to the client computer. The IP address gets forwarded to the client computer's browser.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 2:
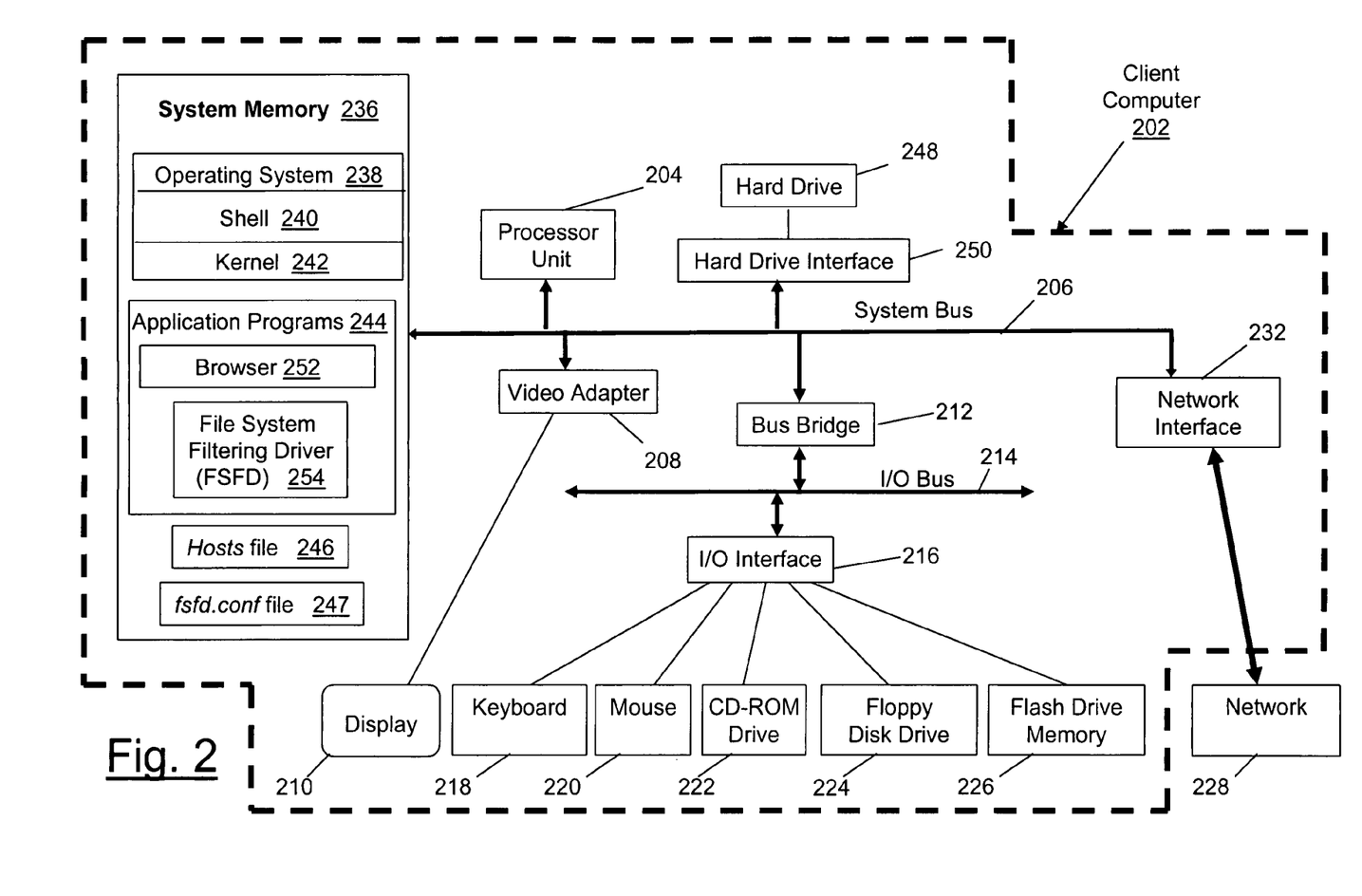
FIG. 2 illustrates an exemplary client computer used by the present invention.

With reference now to FIG. 2, there is depicted a block diagram of an exemplary data processing system that may be used as a client computer in accordance with the present invention. Depicted is a client computer 202, which includes a processor unit 204 coupled to a system bus 206. Also coupled to system bus 206 is a video adapter 208, which drives/supports a display 210. System bus 206 is coupled via a bus bridge 212 to an Input/Output (I/O) bus 214. Coupled to I/O bus 214 is an I/O interface 216, which affords communication with various I/O devices, including a keyboard 218, a mouse 220, a Compact Disk-Read Only Memory (CD-ROM) 222, a floppy disk drive 224, and a flash drive memory 226. The format of the ports connected to I/O interface 216 may be any known to those skilled in the art of computer architecture, including but not limited to Universal Serial Bus (USB) ports.

Client computer 202 is able to communicate with a network 228 via a network interface 232, which is coupled to system bus 206. Preferably, network 228 is the Internet.

Also coupled to system bus 206 is a hard drive interface 250, which interfaces with a hard drive 248. In a preferred embodiment, hard drive 248 populates a system memory 236, which is also coupled to system bus 206. Data that populates system memory 236 includes client computer 202's operating system 238, which includes a command interpreter program known as a shell 240, which is incorporated in a higher level operating system layer and utilized for providing transparent user access to resources such as application programs 244, hosts file 246, and fsfd.conf file 247.

As is well known in the art, a command interpreter or "shell" is generally a program that provides an interpreter and interfaces between the user and the operating system. More specifically, a shell program executes commands that are entered into a command line user interface or from a file.

The shell (UNIX) or command processor (Windows) is generally the highest level of the operating system software hierarchy and serves as a command interpreter. The shell typically provides a system prompt, interprets commands entered by keyboard, mouse, or other user input media, and sends the interpreted command(s) to the appropriate lower levels of the operating system (e.g. a kernel 242) for processing.

Exemplary application programs 244 used in the present invention are a web browser 252 and a File System Filtering Driver (FSFD) 254. Web browser 252 includes program modules and instructions enabling a World Wide Web (WWW) client (i.e., client computer 202) to send and receive network messages to the Internet using HyperText Transfer Protocol (HTTP) messaging. FSFD 254 is a program that is discussed in further detail below in FIG. 4, and essentially intercepts requests to the local file system. While being transparent to both the application program which initiated the request to the local file system and to the underlying local file system services, FSFD 254 is capable of either passing requests and responses through, or performing an additional processing and/or modification of requests and/or responses. The functionality described is used to enable redirection of queries for webpages to a topologically proximate edge server.

The hardware elements depicted in client computer 202 are not intended to be exhaustive, but rather are representative to highlight essential components required by the present invention. For instance, client computer 202 may include alternate memory storage devices such as magnetic cassettes, Digital Versatile Disks (DVDs), Bernoulli cartridges, and the like. These and other variations are intended to be within the spirit and scope of the present invention.

Figure 3:
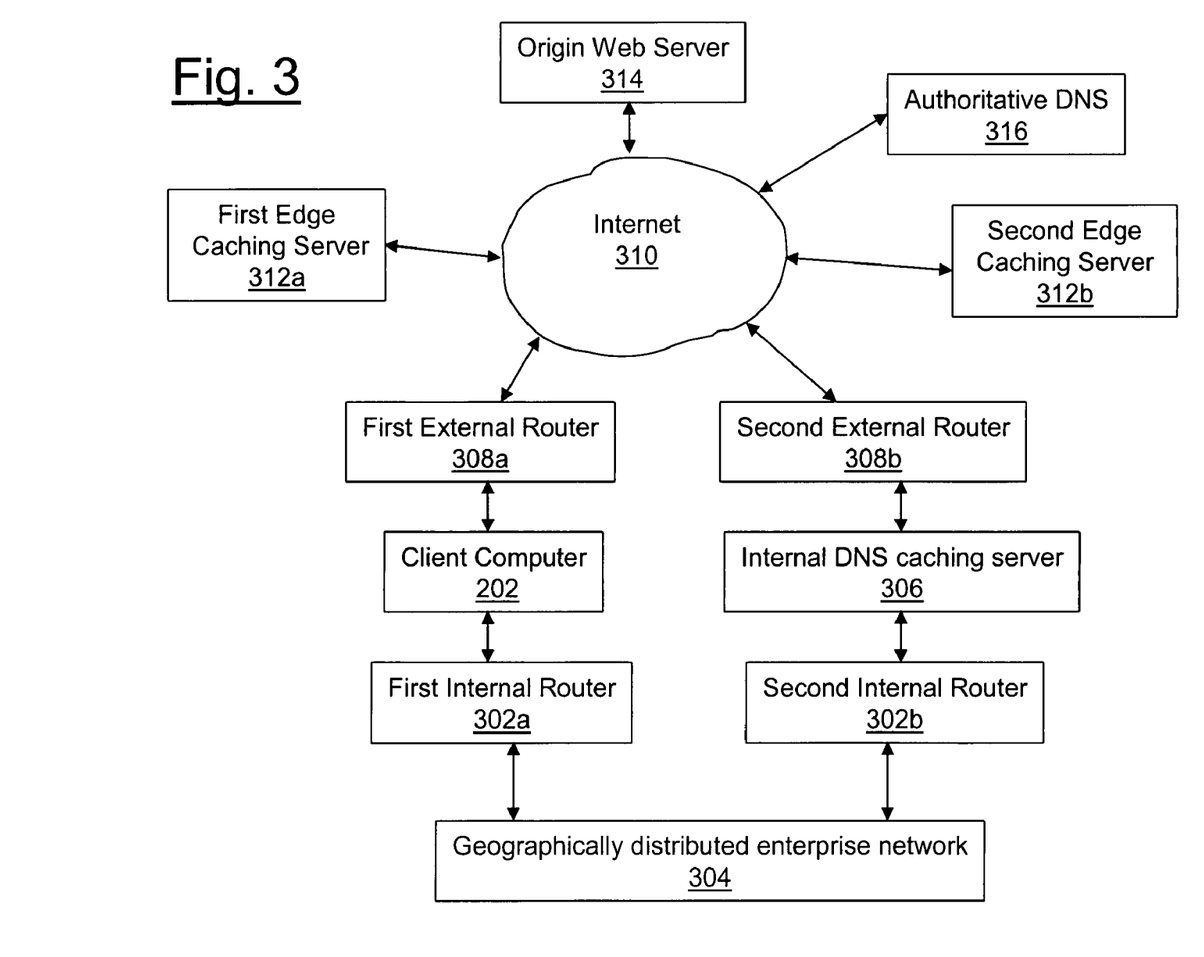
FIG. 3 depicts an exemplary edge cache grid network that is using the present invention.

With reference now to FIG. 3, a block diagram of a network is depicted in which the present invention is useful. The client computer 202 depicted in FIG. 2 is coupled to a first internal router 302a, which is coupled to a geographically distributed enterprise network 304. As suggested by its name, geographically distributed enterprise network 304 is a wide area internal network that spans across significant topological and/or physical distances. Thus, an internal DNS caching server 306, coupled to geographically distributed enterprise network 304 by a second internal router 302b, is far away (network topologically and, possibly, also physically) from client computer 202.

Client computer 202 and internal DNS caching server 306 are coupled to the Internet 310 via respective first and second external routers 308a and b. Coupled to the Internet 310 is a first edge caching server 312a, which is topologically near client computer 202, and a second edge caching server 312b, which is topologically near internal DNS caching server 306. Edge caching servers 312 contain cached portions of content (such as webpages) stored in an origin web server 314, which is also coupled to the Internet 310.

An authoritative DNS 316, which contains primary DNS information for origin web server 314 and any edge caching servers 312 associated with origin web server 314, is also coupled to the Internet 310.

Figure 4:
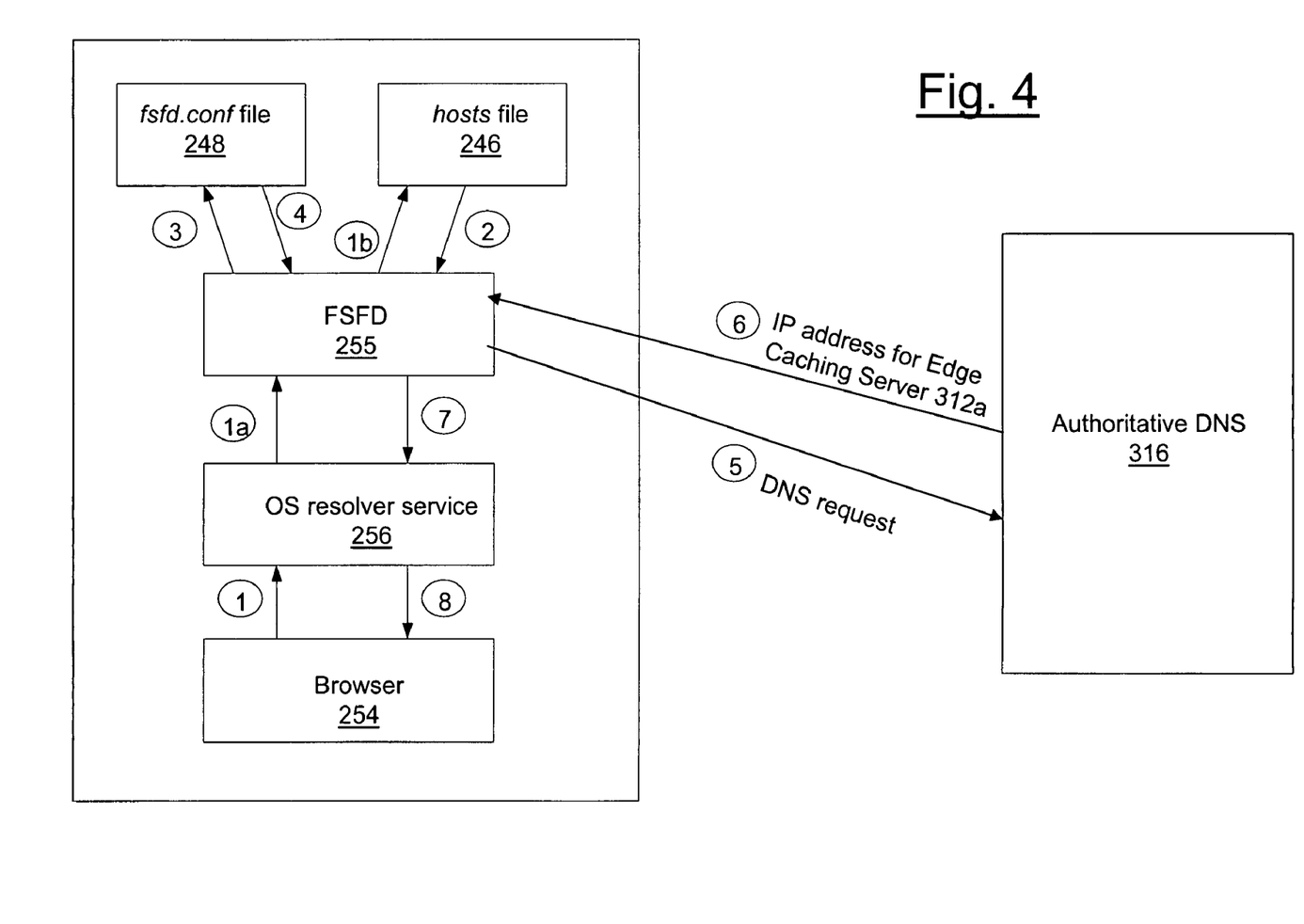
FIG. 4 illustrates a use of a File System Filtering Driver (FSFD) in a client computer on the edge cache grid network depicted in FIG. 3.

Referring now to FIG. 4, a block diagram showing steps taken in a preferred embodiment of the present invention is presented. Within client computer 202, browser 254 sends a domain name resolution request to the local operating system resolver service (Step 1). The request is processed by the operating system and eventually leads to a read request to the local hosts file 246. That read requests gets intercepted by FSFD 255 (Step 1a). FSFD 255 then forwards the requests to underlying file system services supporting hosts file 246 (Step 1b), and upon receiving the file system response (Step 2), extracts the domain name contained therein. For the clarity and conciseness of this disclosure, it is assumed that local hosts file 246 is read line by line; people skilled in the art would easily extrapolate the present description to other possible modes of reading hosts file 246.

If FSFD 255 determines that the domain name which is contained within the requested portion of the hosts file 246, is listed in the local FSFD configuration file (fsfd.conf file 247) (Steps 3 and 4), then FSFD 255 queries the authoritative DNS 316 specified in the local FSFD configuration file (fsfd.conf file 247) for the domain name being resolved (Step 5). Authoritative DNS 316 then returns the IP address for the edge caching server (first edge caching server 312a) that is closest to client computer 202. FSFD then substitutes the IP address contained in the DNS response (Step 6) for the IP address characters in the file system response to the browser 254 through the OS Resolver Service 256 (Steps 7 and 8).

However, if FSFD 255 determines that the domain name that is contained within the requested portion of the hosts file 246 is not listed in the local FSFD configuration file (fsfd.conf file 247), then FSFD 255 forwards the file system request and response unmodified through the chain of system services.

Figure 5:
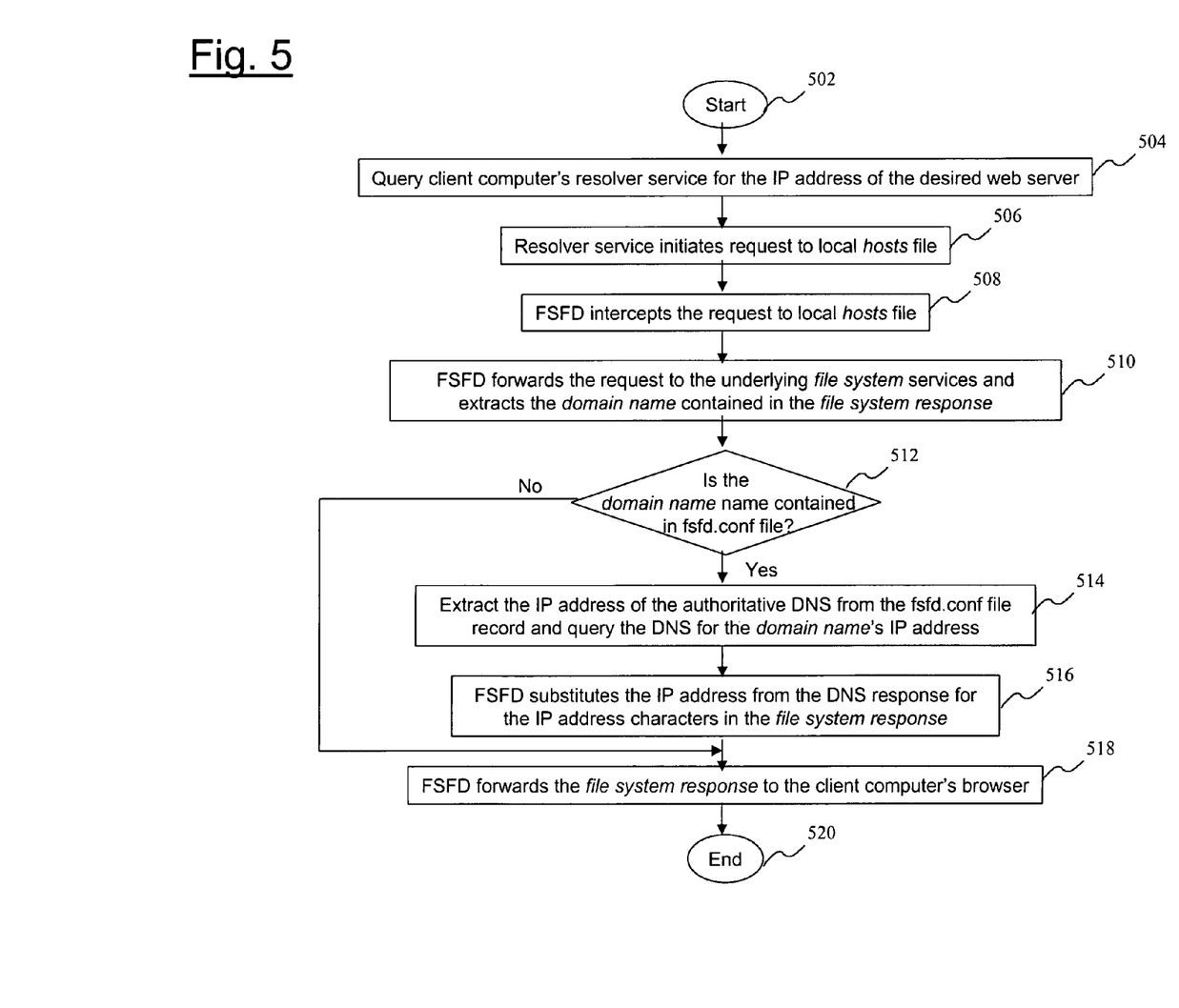
FIG. 5 is a flow-chart of exemplary steps taken in the present invention.

With reference now to FIG. 5, a flow-chart describing exemplary steps taken by the present invention. After initiator block 502, a query is sent (block 504) to the client computer's OS Resolver Service for the IP address of a web server that contains desired content (such as a webpage). OS Resolver Service is configured to first consult local hosts file, so it initiates the requests to the local file system (block 506). FSFD then intercepts the requests (block 508), and forwards the request to the underlying file system services and extracts the domain name contained in the file system response string (block 510). A decision is made as to whether the domain name extracted is contained in fsfd.conf file (query block 512). If not, processing continues at block 518. Otherwise FSFD extracts the IP address of the authoritative DNS from the fsfd.conf file record and queries the DNS for the IP address of the desired domain name contained in the file system response string (block 514). Then FSFD substitutes the IP address from the DNS response for the IP address characters in the file system response string (block 516). Finally, FSFD forwards the file system response string to the client computer browser (block 518), thus ending the process (terminator block 520).

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method comprising:
    coupling a client computer to an enterprise-wide network to which
    a local Domain Name Server (DNS) is communicatively coupled;
    requesting, by the client computer, a content from a web server; and
    in response to the content requested by a client computer being on an edge caching server that is coupled to a Wide Area Network (WAN) the client system:
        circumventing the local DNS and using an authoritative DNS on the WAN to obtain an address of the edge caching server;
        receiving from the authoritative DNS on the WAN an IP address for the edge caching server; and
        replacing, in a file system response to an operating system domain name resolver service of the client computer, an IP address for an origin web server with the IP address for the edge caching server.

2. The method of claim 1, further comprising:
    sending a request to the edge caching server for the content; and
    receiving the content at the client computer.

3. The method of claim 1, wherein the WAN is the Internet.

4. The method of claim 3, wherein the content is a webpage.

5. The method of claim 1, wherein the client computer further comprises:
    a hosts file for storing Internet Protocol (IP) addresses; and
    a file system filtering driver, wherein a request for the address of the edge caching server is obtained by the file system filtering driver that performs the steps of:
    filtering a request, sent by the operating system domain name resolver service to the hosts file, for an IP address of an origin web server;
    sending a request for the IP address of the origin web server to the authoritative DNS.

6. A system comprising:
    a client computer coupled to an enterprise-wide network;
    a local Domain Name Server (DNS) coupled to the enterprise-wide network;
    a browser in the client computer for requesting a content from a web server; and a file system filtering driver in the client computer, wherein, if the content requested by a client computer is on an edge caching server that is coupled to a Wide Area Network (WAN), the file system filtering driver: circumvents the local DNS to use an authoritative DNS on the WAN to obtain an address of the edge caching server; receiving from the authoritative DNS on the WAN an IP address for the edge caching server; and replacing, in a file system response to an operating system domain name resolver service of the client computer, an IP address for an origin web server with the IP address for the edge caching server.

7. The system of claim 6, wherein the WAN is the Internet.

8. The system of claim 7, wherein the content is a webpage.

9. The system of claim 6, wherein the client computer further comprises:
    a hosts file for storing Internet Protocol (IP) addresses, wherein the file system filtering driver performs the steps of:
    filtering a request, sent by the operating system domain name resolver service to the hosts file, for an IP address for an origin web server;
    sending a request for the IP address of the origin web server to the authoritative DNS.

10. A computer program product, residing on a non-transitory computer usable storage medium, comprising:
    computer program code for coupling a client computer to an enterprise-wide network;
    computer program code for coupling a local Domain Name Server (DNS) to the client computer;
    computer program code for requesting, by the client computer, a content from a web server; and
    computer program code for, in response to determining that the content requested by a client computer is on an edge caching server that is coupled to a Wide Area Network (WAN): circumventing the local DNS and using an authoritative DNS on the WAN to obtain an address of the edge caching server; receiving from the authoritative DNS on the WAN an IP address for the edge caching server; and replacing, in a file system response to an operating system domain name resolver service of the client computer, an IP address for an origin web server with the IP address for the edge caching server.

11. The computer program product of claim 10, further comprising:
    computer program code for sending a request to the edge caching server for the content; and
    computer program code for receiving the content at the client computer.

12. The computer program product of claim 10, wherein the WAN is the Internet.

13. The computer program product of claim 12, wherein the content is a webpage.

14. The computer program product of claim 10, wherein the client computer further comprises:

a hosts file for storing Internet Protocol (IP) addresses; and a file system filtering driver, wherein a request for the address of the edge caching server is obtained by the file system filtering driver that performs the steps of:
    filtering a request sent by the operating system domain name resolver service to the host file, for an IP address for an origin web server; and
    sending a request for the IP address of the origin web server to the authoritative DNS.

* * * * *